United States Patent [19]

Gibson et al.

[11] 3,875,328

[45] Apr. 1, 1975

[54] APPARATUS AND METHOD FOR MEASURING THE SIGNAL TO NOISE RATIO FOR A PERIODIC SIGNAL

[75] Inventors: John James Gibson, Princeton; Hans George Schwarz, Pennington, both of N.J.

[73] Assignee: RCA Corporation, New York, N.Y.

[22] Filed: Aug. 3, 1973

[21] Appl. No.: 385,300

[52] U.S. Cl. .................. 178/6, 178/DIG. 4, 325/363

[51] Int. Cl. .............................................. H04b 1/00

[58] Field of Search ............ 178/DIG. 4, 6, DIG. 13; 325/363, 67, 308

[56] References Cited

UNITED STATES PATENTS

| | | | |
|---|---|---|---|
| 3,302,116 | 1/1967 | Free | 325/363 |
| 3,350,643 | 10/1967 | Webb | 325/67 |
| 3,475,683 | 10/1969 | Holland | 325/363 |
| 3,683,282 | 8/1972 | D'Amato | 325/363 |
| 3,737,781 | 6/1973 | Deerkoski | 325/363 |
| 3,792,195 | 2/1974 | Wilson | 325/363 |

*Primary Examiner*—Howard W. Britton
*Assistant Examiner*—Michael A. Masinick
*Attorney, Agent, or Firm*—Edward J. Norton; William Squire

[57] ABSTRACT

Apparatus for measuring the signal-to-noise ratio of a television signal wherein the noise and signal level of the signal are derived from the on-the-air television signal horizontal sync pulses. The noise is derived by sampling the sync pulses and bandpass filtering the samples, while the signal level is derived by D.C. filtering the sync pulse samples. The signal-to-noise ratio is the ratio between the derived signals which ratio is provided by a suitably calibrated meter.

15 Claims, 1 Drawing Figure

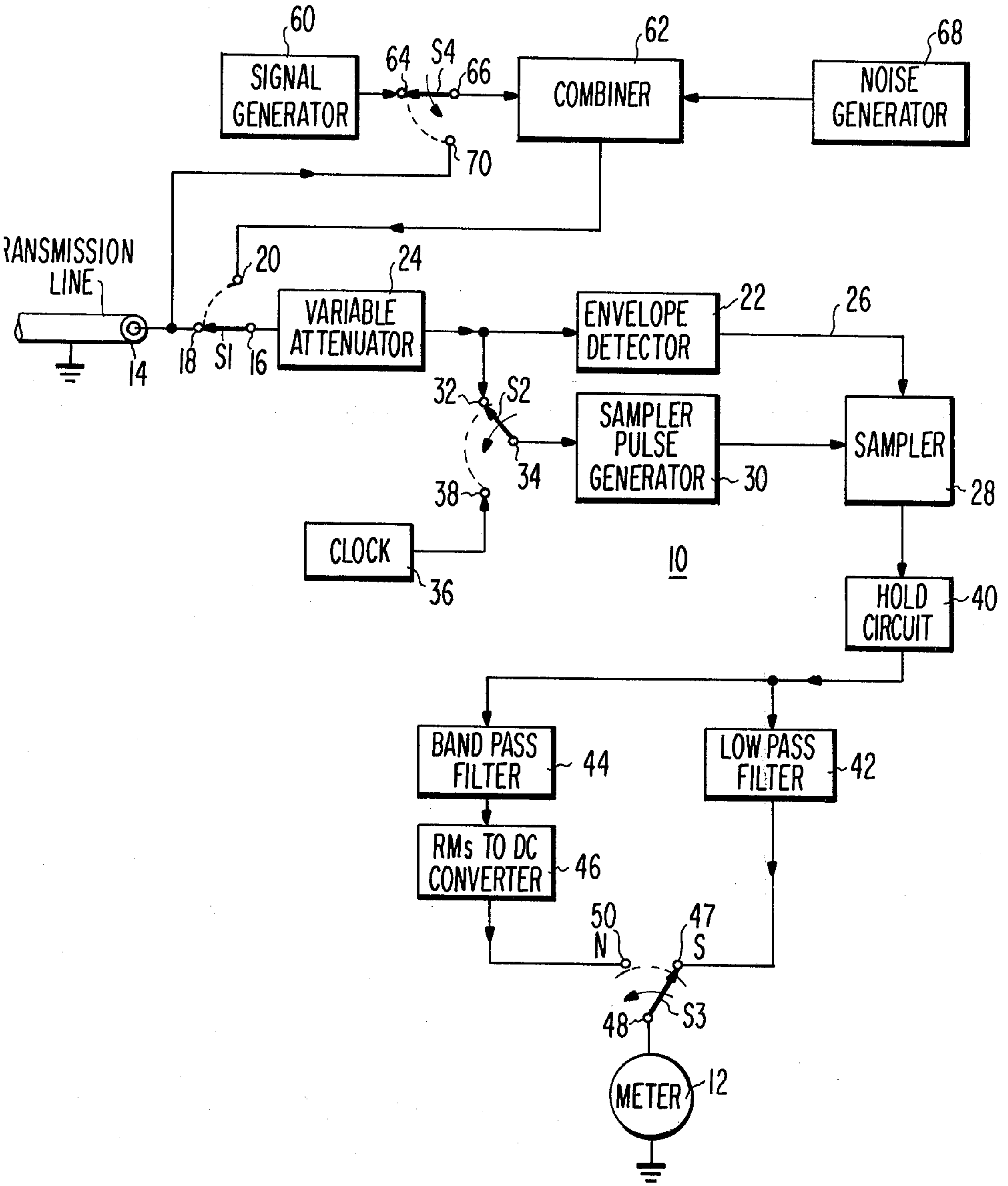
SIGNAL GENERATOR
60
64
S4
66
70
COMBINER
62
NOISE GENERATOR
68
TRANSMISSION LINE
14
18
S1
16
20
VARIABLE ATTENUATOR
24
ENVELOPE DETECTOR
22
26
32
S2
34
38
SAMPLER PULSE GENERATOR
30
SAMPLER
28
CLOCK
36
10
HOLD CIRCUIT
40
BAND PASS FILTER
44
LOW PASS FILTER
42
RMs TO DC CONVERTER
46
50
N
47
S
48
S3
METER
12

APPARATUS AND METHOD FOR MEASURING THE SIGNAL TO NOISE RATIO FOR A PERIODIC SIGNAL

BACKGROUND OF THE INVENTION

The present invention relates to process and apparatus for signal-to-noise ratio measurement of a periodic signal.

One particular practical application of an apparatus for measuring the signal-to-noise ratio of a periodic signal is in the measurement of the signal-to-noise ratio in an on-the-air live television broadcast signal transmitted over cable through the use of community antenna television (CATV). In this system an antenna located in an appropriate location and elevation receives a broadcast commercial television signal, processes and then retransmits the broadcast signals through cables to television receivers located in the homes of CATV subscribers. It is desirable in the operation of the CATV system to periodically perform tests on the system to determine the quality of the transmitted signal prior to the receipt of complaints from disgruntled subscribers.

To ensure that the CATV system is operating adequately, tests should be periodically performed on the system to determine that the signal level along the cable is proper, and that the frequency response of the cable transmission system is proper over the entire frequency range of interest. Obviously, such a test system must not introduce disturbances into the transmission system which would reduce the quality of the live on-the-air signal then being received by the subscribers.

One such system for testing CATV systems transmits a swept test signal on the cable transmission line. The response of the system to that swept signal is monitored at test points provided at different locations along the transmission line. The disadvantage of this procedure is that it produces intolerable interference with the subscriber's reception of the television signals, therefore requiring the regular broadcast transmission to be shut down while the system is being monitored. Since this is undesirable during regular viewing hours, the testing is performed at those times when most subscribers are not viewing their receivers. However, should a subscriber complain of poor reception any time during regular hours, the CATV operator must necessarily shut down the system in order to test it, creating great inconvenience to all of the subscribers.

To alleviate these conditions some systems utilize swept signals of short duration during the on-the-air broadcasting so as to provide a minimum interference with a transmitted signal. However, this does not in itself provide quality test to the television signal itself. Still other systems extract noise from the transmitted television signal during a blanking interval. Attenuators vary the signal level of the transmitted signal until the noise power is caused to be equal to a preselected threshold value. The attenuated value is then utilized for further computation of the signal-to-noise ratio of the television signal. However, this later system has a disadvantage in that a separate test signal need be provided to establish a reference signal level. This necessitates additional reference signal generating and measuring equipment in the system adding to the system cost and complexity.

SUMMARY OF THE INVENTION

An apparatus for measuring the signal-to-noise ratio of a periodic input signal comprises means for sampling the same certain portion of each cycle of a sufficient number of cycles of the input signal to thereby provide as an output thereof a signal comprising a plurality of input signal samples whose average value manifests the average peak level of the input signal and whose standard deviation value manifests the magnitude of noise in the input signal. Means are provided for deriving from the output signal a first signal having a value manifesting the average value and a second signal having a value manifesting the standard deviation value. Means responsive to the first and second signals compare the value of the first signal to the value of the second signal to thereby provide an output signal therefrom manifesting the signal-to-noise ratio of the input signal. By sampling a portion of the given cycle, the signal-to-noise measuring apparatus does not introduce interfering spurious signals with the remainder of the input signal in the unsampled portion of that cycle.

A method for measuring the signal-to-noise ratio of a periodic input signal comprises sampling the same certain portion of each cycle of a sufficient number of cycles of the input signal to thereby provide as an output thereof a signal comprising a plurality of input signal samples whose average value manifests the average peak level of the input signal and whose standard deviation value manifests the magnitude of the noise of the input signal. The method further comprises deriving from the output signal applied as an input thereto a first signal having a value manifesting the average value and a second signal having a value manifesting the standard deviation value. By comparing the value of the first signal to the value of the second signal, there is thereby provided an output signal manifesting the signal-to-noise ratio of the input signal.

The sole FIGURE in the drawing is a block diagram of an apparatus constructed in accordance with one embodiment of the present invention.

DETAILED DESCRIPTION

In the drawing, apparatus 10 provides indication on meter 12 of the signal-to-noise ratio in a transmitted television signal appearing on transmission line 14 such as a CATV cable.

Apparatus 10 receives the transmitted television signal at input terminal 16 through switch S1 which is a suitable device for connecting either terminal 18 or 20 to terminal 16 in accordnce with the test or calibrate modes respectively of the apparatus to be described. Terminal 16 is coupled to envelope detector 22 through a variable attenuator 24. Envelope detector 22 has the output thereof appearing on lead 26 applied to sampler 28. The output of variable attenuator 24 is also coupled to sampler 28 through sample pulse generator 30 and switch S2 by way of switch terminals 32 and 34. Clock 36 is selectively coupled to sample pulse generator 30 by way of terminals 38 and 34 of switch S2. The switch position of switch S2 is also set in accordance with the test or calibrate mode of apparatus 10 to be described. Attenuator 24 is a suitable device which is set during apparatus 10 calibrate mode for setting meter 12 to a reference level in a manner to be described.

Envelope detector 22 in practice comprises a portion of a conventional TV receiver including the RF stage, mixer, IF amplifier, local oscillator and second detector such that the signal appearing on lead 26 is the envelope of the television signal including the information video portion and the synchronizing pulses including the horizontal sync pulses.

The sample pulses of generator 30 applied to sampler 28 are synchronizing pulses which are synchronized with the horizontal sync pulses appearing in the television signal. In practice sample pulse generator 30 may include a portion of a conventional TV receiver which extracts the horizontal sync pulses from the television signal. Generator 30 includes additional circuitry for processing the extracted horizontal sync pulses into suitable form for operating sampler 28. In essence sampler 28 is operated at the horizontal sync rate of the television signal appearing on transmission line 14. This rate is generally 15.75 kilohertz. Synchronization between the pulses provided by generator 30 and the detected sync pulses appearing on lead 26 is such that sampler 28 samples the peak or maximum amplitude of the horizontal sync pulses. Generally, this peak amplitude occurs about two microseconds from the leading edge of the horizontal synchronizing (sync) pulse appearing in an applied waveform.

Sample pulses provided by sampler 28 are substantially shorter than half a cycle of the highest desirable noise frequency in the video of the television signal. Sampling at the peak amplitude of the synchronizing pulse continues in this case through the vertical synchronizing interval where sampling occurs at the peak amplitude of the vertical synchronizing pulses as well. It will be appreciated that successive horizontal synchronizing pulses need not be sampled to provide a statistical indication of both the average signal level of the sampled signal and the average RMS noise level in the sampled signal. That is, sampler 28 need sample a sufficient proportion of cycles, not necessarily successive cycles, of the television signal so as to provide a sufficient number of samples in accordance with well known statistical principles to provide a signal at the output of sampler 28 which reasonably represents the average signal and noise levels of the television signal on transmission line 14.

The amplitude of these samples at the output of sampler 28 have a mean value proportional to the value of the peak amplitude of the synchronizing voltage appearing at the output of detector 22. The standard deviation of the amplitude of the samples at the output of sampler 28 is proportional, with the same proportionality factor as the mean value, to the root mean square (RMS) noise voltage in the video leaving the envelope detector 22.

The output of sampler 28 comprising the sampled synchronizing pulses in the envelope appearing on lead 26 is applied to hold circuit 40. As each cycle of the television signal includes the video portion or picture information as well as the synchronizing pulses, the cycle of the television signal is considerably longer than the duration of the sampled pulses provided by sampler 28. Hold circuit 40 is a suitable pulse stretch circuit which holds each of the pulses provided by sampler 28 to a time duration slightly less than the time duration of each cycle of the television signal occurring between horizontal sync pulses. The stretched pulses provided by hold circuit 40 are applied as an input to low pass filter 42 and bandpass filter 44. The output of low pass filter 42 is applied to D.C. meter 12 through switch S3 by way of selected terminals 47 and 48. The output of bandpass filter 44 is applied to meter 12 through RMS to D.C. converter 46 and switch S3 by way of selected terminals 48 and 50.

If the sampled pulses provided by sampler 28 and hold circuit 40 are passed through an ideal sharp cut off low pass filter 42 with a bandwidth of one-half of the horizontal sync rate or one-half the rate of the output of generator 30, the output of the low pass filter 42 is audio noise with a D.C. (direct current) component proportional to the signal voltage at the peak of sync and the RMS noise voltage proportional to the RMS noise in the video. The D.C. component at the output of low pass filter 42 applied to meter 12 serves as a signal which manifests the average signal level of the television signal on transmission line 14. It is assumed that the noise appearing in any portion of a cycle of a television signal represents the magnitude of the noise appearing in the remainder of that cycle. Therefore, a sample of noise taken at the horizontal sync pulse is assumed to represent the magnitude of the noise on the television signal throughout the sampled cycle. The D.C. component at the output of low pass filter 42 represents the average peak signal level of the horizontal sync pulses. Comparing the noise at this same point in each cycle to that signal level is considered equivalent to comparing the noise at any selected time in the cycle of the television signal to the signal level at that selected time. When switch S3 is set to receive the output of low pass filter 42, the meter indication by meter 12 is an indication of the average peak signal level of the television signal for purposes of signal-to-noise measurement.

Since the output of low pass filter 42 would also include audio noise or the RMS noise voltage proportional to the RMS noise in the video, in accordance with the present invention, it is a matter of separating the D. C. components and the RMS noise voltage components from the output of low pass filter 42 and applying these separate components to meter 12 at terminals 47 and 50, respectively.

To simplify the structure, a separate bandpass filter 44 is provided having a bandwidth of about 500 Hertz to 7 kilohertz. Filter 44 therefore rejects all D.C. components in the signal applied to RMS to D.C. converter 46. The bandwidth of filter 44 is also about half the horizontal sync rate of the television signal. The audio noise voltage at the output of filter 44 is converted to a D.C. level by suitable RMS to D.C. converter 46. The amplitudes of both the D.C. signal from filter 42 and from converter 46 can be substantially increased by using a sample and hold circuit such as circuit 40 which holds the sampled value for a duration substantially longer than the duration of the sampled pulses from sampler 28.

If a signal $A(t)$ is sampled by impulses, the resulting train of short sample pulses can be expressed mathematically as $$s(t)=A(t)\sum_{k=-\infty}^{k=+\infty}\delta(t-kT)=A(t)\left[1+2\sum_{n=1}^{\infty}\cos(2\pi nt/T)\right]$$

where $s(t)$ is the expression for the sampled signal, $A(t)$ is the input signal, δ is the impulse function, $t$ is time, $T$ is the sampling period and $n$ is an integer. By impulses is meant pulses much shorter than the cycle time of the highest frequency of the intelligence to be sampled. Thus the sampling process is a mixing process generating beats between the frequency components of a television signal $A(t)$ and all frequencies $n/T$. The audio bandwidth from 0 to $n/2T$ contains every frequency component of $A(t)$ once and with the same amplitude as in $A(t)$. Thus, an audio spectrum analysis is equivalent to a video spectrum analysis, except that an audio frequency, $f_1$ could be originated by a frequency $n/T \pm f_1$ in the video. Holding the sample does not change the low frequency spectrum as long as the spectrum of the hold pulse is reasonably flat in the audio band under consideration. If not, the frequency spectrum of the hold pulse multiplies the spectrum of the audio filter. Minor correction for this effect can be compensated. It may be desirable to cut out the very low frequencies of the sampled signal, since these components may be introduced by hum, poor clamping at the transmitter, cross modulation and other causes.

In practice, envelope detector 22 may introduce a certain amount of noise characteristic for the particular detector utilized with a given system 10, the noise varying in the detector from system to system. Any noise signal received at terminal 50 will include not only the noise at the television signal, but in addition, will include the noise contribution of the detector 22. As a result, meter 12 can be calibrated to provide a correction factor with respect to the amount of noise in the signal received at terminal 50. In addition, means need be provided to calibrate the scale factor of meter 12 to provide an indication of the signal-to-noise ratio in voltages of given magnitudes representing the signal and noise voltages that are applied to meter 12 at terminal 48.

This may be accomplished by providing signal generator 60 which is selectively coupled to combiner 62 through switch S4 coupled between terminals 64 and 66. A second input to combiner 62 is supplied from noise generator 68. Signal generator 60, combiner 62 and noise generator 68 are conventional circuits well known in the communications art. Combiner 62 serves to combine the signal of a predetermined level with the noise generated by generator 68 also having a predetermined value. The output of combiner 62 is applied to terminal 20. The signal received at terminal 20 is therefore a signal having a known signal-to-noise ratio. The signal-to-noise ratio is adjustable between any desirable range as provided by signal generator 60 which is adjustable and noise generator 68 which also is adjustable and which are well known instruments. Switch S4 has a second switch position which couples terminal 66 to terminal 70 which is coupled to terminal 18.

The gain of variable attenuator 24 is equal to or less than one. Envelope detector 22 has no automatic gain circuitry which circuitry would tend to provide unknown variations in amplitude of the output signal on lead 26. These unknown variations in gain of the output signal would tend to vary the amplitude of the signal and noise D.C. signals applied to terminals 47 and 50, respectively in an unknown manner, therefore destroying the validity of the measurements.

Apparatus 10 includes a clock 36 whose clock rate is the same as the horizontal sync rate of a television signal transmitted on transmission line 14. This permits calibration of meter 12 in a manner to be described. In addition clock 36 permits testing the transmission line 14 for noise by sending a given signal down the transmission line 14 without an inherent sync signal. Clock 36 in these instances is coupled to sample pulse generator 30 by way of switch S2.

In the following discussion it will be assumed that meter 12 has been calibrated and that a correction factor is included therein for internal noise within apparatus 10.

Switches S1, S2, S3 and S4 are placed in the switch position shown in the drawings. In these positions S1 couples terminal 18 to terminal 16, S2 couples terminals 32 to 34 and S3 couples terminal 46 to 48 while S4 is open between terminals 66 and 70. At this time as on-the-air "live" television broadcast is being transmitted along a conventional CATV cable forming transmission line 14. The received television signal is processed through variable attenuator 24 to envelope detector 22, the detected envelope being applied to sampler 28. In addition, the television signal is being applied to sample pulse generator 30 which extracts horizontal sync pulses from the television signal converted to a form suitable for operating sampler 28 at the horizontal sync rate.

Sampler 28 then samples detected envelope at the horizontal sync rate in time conicidence with the horizontal sync pulse peaks. Sampler 28, in effect, is phase locked with the horizontal sync pulse peak amplitude. The output of sampler 28 is a plurality of pulses, each pulse being a sampled portion of the horizontal sync pulse in the television signal. This sampled pulse includes the signal as originally transmitted and, in addition, noise introduced by the transmission system as well as noise introduced by the detector.

As pointed out above, the amount of noise contributed by the detector 22 is compensated for by a correction factor calibrated into meter 12 and we will not be concerned with that correction factor at this point in the discussion. A serial stream of pulses provided by sampler 28 is applied to hold circuit 40, which, in effect, stretches each of the pulses up to the time duration of each cycle of the television signal. This train of stretched pulses is then applied to low pass filter 42 and bandpass filter 44 which respectively derive at least a D.C. signal whose value corresponds to the average peak value of the horizontal sync pulses in the television signal.

The output of the bandpass filter 44 is a signal in the audio frequency range having a magnitude corresponding to the magnitude of the noise present on the horizontal sync pulses in the television signal. The RMS to D.C. converter 46 produces a D.C. signal representing the magnitude of the RMS noise at the output of filter 44. As a result two D.C. signals are applied simultaneously to terminals 47 and 50. The D.C. signal at terminal 47 represents the signal (S) amplitude while the signal applied to terminal 50 represents the noise (N) amplitude.

At this time the meter 12 will provide an indication of the signal amplitude. However, variable attenuator 24 is adjusted so as to zero the meter 12 to indicate at a predetermined point on the calibrated face thereof the reading of the value of the amplitude of the D.C. signal at terminal 47. An operator then switches switch S3 to couple terminal 50 to terminal 48 and decouple terminal 47 to terminal 48 to apply the D.C. signal from converter 46 to meter 12, this signal representing the noise as pointed out above. The face of meter 12 having been calibrated in a manner to be described gives an indication of the signal-to-noise ratio directly on the live transmitted signal.

The zeroing in of meter 12 during each test by adjusting the variable attenuator 24 does not affect the calibration of meter 12 for the reason that the input level $L_R$ to the receiver is kept constant. For purposes of explanation, the following analysis will be made in terms of noise-to-signal relationships.

It can be shown that the relative system excess noise level E to the relative signal level L on the cable is shown by the following relationship $$E/L = E_R/L_R - (F_R - 1)/L_R \quad (2)$$

The actual signal to noise ratio is shown by $$(S/N) = [1/(1 + E/L)]\ (S_o/N_o) \quad (3)$$

where $S_o$ is the absolute signal reference level and $N_o$ is the absolute reference noise level. To be more specific $N_o$ is the available thermal noise power from a resistor in a specified reference bandwidth.

The signal level received by detector 22 is $L_R$, where $L_R$ is $(L/A_V)$, and where $A_V$ is the attenuation setting of attenuator 24. It is perferred that $L_R$ have a level of about 6 dbmv ($L_R = 4$), except for weak signals for which the IF gain of envelope detector 22 is increased by about 12 db so that $L_R = 1/4$ (−6 dbmv). $E_R$ is the relative excess noise level on lead 26, while $L_R$ is the relative signal level on lead 26. The factor $(F_R - 1/L_R)$ represents the noise introduced by detector 22. This factor is subtracted from the $E_R/L_R$ value to yield the relative excess noise to relative signal level on the cable. This correction factor depends on the noise FIGURE $F_R$ and the relative receiver signal input level $L_R$ and is independent of the attenuation $A_V$ of the attenuator 24.

To calibrate the meter 12, a signal of known value and a noise signal of known value are applied respectively by generator 60 and generator 68 to combiner 62. Switch S1 is connected to terminal 20 to apply the combined signal and noise signals to attenuator 24. The sample pulse generator 30 includes a local oscillator of a conventional TV receiver operating at approximately 15.75 kilohertz. The clock 36 need not be coupled to generator 30 to provide the synchronizing signal for operating sampler 28 at the horizontal television sync pulse rate. Otherwise, clock 36 is coupled to terminal 34 by switch S2 to generate sampling pulses from generator 30 to operate sampler 28. Relative signal to relative noise level ratio in the output of combiner 62 is accurately known by the settings on the noise generator and the signal generator. Thus the output scale of meter 12 can be calibrated in terms of E/L ratio transmitted on transmission line 14. This calibration may be slightly different for different channels having different transmission frequencies due to the correction factor $(F_R-1)/L_R$ being slightly different for different channels. That is, meter 12 should provide an indication of the actual signal-to-noise ratio set in signal generator 60 and noise generator 68. The actual noise produced by detector 22 need not be independently determined since the actual reading of meter 12 will be a direct reading as far as meter 12 is concerned of the signal-to-noise ratio of the signal produced by generators 60 and 68.

The correction factor $(F_R-1)/L_R$ can also be determined with two measurements. In the first measurement, the signal-to-noise produced by generators 60 and 68 is set to an arbitrary value $x$ yielding an output reading $y$ on meter 12. The noise is increased in generator 68 by a factor $k$ to double the output noise, then the correction factor is $$(F_R-1)/L_R = (k-2)\times \quad (4)$$

Another manner of measuring cable noise on transmission line 14 assumes the correction factor for the noise in detector 22 is known. In this case a comparative measurement employs noise generator 68 which is independent of amplifier drift and meter calibration. Switch S1 is connected between terminals 20 and 16, switch S4 connects terminal 66 to terminal 70 and switch S2 is connected between terminals 32 and 34. The signal level is determined as described above by the following relationship $$L = 2A_V L_R \quad (5)$$

where the factor 2 represents a 3 db loss in combiner 62. Excess noise from noise generator 68 is then introduced to double the output noise at terminal 50. The relative excess noise on transmission line 14 is then determined in accordance with the following relationship $e = E_G - (F_R - 1)2A_V$. Where $E_G$ is the noise introduced by generator 68.

A still further procedure for measuring the signal-to-noise can be made with the $E_G/L_G$ provided by signal generator 60 and noise generator 68 where $E_G$ is the noise of generator 58 and $L_G$ is the signal level of generator 60. This latter measurement is independent of all parameters in apparatus 10.

Generally, the noise introduced by detector 22 should be low compared to the noise to be measured in the transmission line. Where the envelope detector 22 and the horizontal sync pulse generator of pulse generator 30 are provided by a standard television receiver, the signal-to-noise ratio of the receiver is limited to about 50 db. Increasing the signal level to improve this ratio leads to overload effects in the mixer stage if the RF gain is maintained. For test equipment, however, the mixer stage can be modified to handle higher signal levels. It is possible to obtain an improved signal-to-noise ratio of 60 db. At such a value it is possible to measure a system signal noise of up to about 50 db.

It will be appreciated that a system's noise to be measured may be contaminated by signal components in an actual CATV system. These signal components include co-channel sound carrier, demodulated video components for the upper adjacent channel, beat frequencies between the picture carrier and components in the adjacent channel and beat frequencies between picture carrier and components in the lower adjacent channel. It is preferable that all signal components which could lead to noise contamination should be attenuated to a level of −70 db relative to the picture carrier at the input to the second detector of a conventional TV receiver modified in accordance with the present invention. This may be accomplished by the addition of additional filters provided in the circuit by apparatus 10.

In the alternative, noise may be derived as follows. The sampled signal from sampler 28 is applied to an inverting circuit to reverse the polarity of alternate pulses. The pulses of opposite polarity are then applied to an adder so as to subtract adjacent pulses. The difference is the noise present. It can be shown that the resultant difference in the subtracted pulses is proportional to the average RMS noise in a television signal. This RMS noise may then be applied to converter 46. Sampled pulses from sampler 28 are applied to low pass filter 42 as illustrated in the drawing. The alternate sample method has the advantage of eliminating low frequency noise as caused by hum, poor clamping, etc. Sampling can also be omitted during the vertical blanking interval, VBI, to avoid disturbance due to the special nature of the signal during the VBI.

It will now be appreciated that an apparatus has been shown for measuring the signal-to-noise ratio of a periodic input signal. The apparatus includes means for sampling the same certain portion of each cycle of a sufficient proportion or number of cycles of the input signals to provide an output signal having an average value manifesting the average peak level of the input signal. Additionally, means are provided for deriving from this output signal first and second D.C. signals representing the average signal level of the periodic input signal and a standard deviation value of the periodic input signal. By applying these first and second signals to means such as means 12, indication is provided of the signal-to-noise ratio of the input signal.

What is claimed is:

1. An apparatus for measuring the signal to noise ratio of a periodic input signal, comprising:

cycle sampling means for sampling solely the same certain portion of each cycle of a sufficient number of cycles of said input signal to thereby provide as an output thereof a signal comprising a plurality of input signal samples whose average value manifests the average peak level of said input signal and whose standard deviation value manifests the magnitude of the noise in said input signal, means for deriving from said output signal applied as an input thereto a first D.C. signal having a value manifesting said average value and a second D.C. signal having a value manifesting said standard deviation value, and means responsive to said first and second signals applied as respective inputs thereto for comparing the value of said first signal to the value of said second signal to thereby provide an output signal therefrom manifesting the signal to noise ratio of said input signal.

2. The apparatus of claim 1 wherein said deriving means includes a low pass filter for deriving said first signal and a bandpass filter for deriving said second signal.

3. The apparatus of claim 1 wherein said input signal has a timing portion and an information portion, said cycle sampling means being synchronized with said timing portion.

4. The apparatus of claim 1 wherein said input signal is a television signal and said certain portion is the horizontal synchronizing portion of said television signal.

5. The apparatus of claim 1 wherein said input signal includes a timing portion, said cycle sampling means including means for deriving said timing portion from said input signal and means responsive to said derived timing portion for synchronizing said sampling means to said input signal.

6. An apparatus for measuring the signal to noise ratio of a television signal including a timing portion and a video portion comprising:

cycle sampling means for sampling solely the timing portion of each cycle of a sufficient proportion of cycles of said television signal to thereby provide as an output thereof a signal comprising a plurality of timing portion samples whose average value manifests the average peak level of said television signal and whose standard deviation value manifests the magnitude of the noise in said television signal, means for deriving from said output signal a first signal having a value proportional ot said average value and a second signal having a value proportional to said standard deviation value, and means responsive to said first and second signals for comparing the value of first signal to said second signal, the ratio between said first and second signals manifesting the signal to noise ratio of said television signal.

7. The apparatus of claim 6 wherein said cycle sampling means includes detecting means responsive to said television signal applied thereto for detecting the envelope of said television signal.

8. The apparatus of claim 6 wherein said cycle sampling means includes means for deriving a timing signal from said television signal, cycle said sampling means being responsive to said derived timing signal for synchronously sampling said timing portion of said television signal.

9. The apparatus of claim 6 wherein said second signal deriving means includes a bandpass filter and means for providing as an output signal therefrom a signal having a D.C. level manifesting the rms noise level of said sampled timing portion applied as an input to said bandpass filter.

10. The apparatus of claim 6 wherein said first signal deriving means includes a low pass filter having said timing portion samples applied as an input thereto.

11. An apparatus for measuring the signal to noise ratio of a television signal including a timing portion having a given repetition rate and information portion, comprising:

detecting means for detecting said television signal to produce as an output thereof a signal manifesting the envelope of said television signal, timing signal generating means for generating a timing signal having a repetition rate the same as said given repetition rate, cycle sampling means responsive to said detected television signal and said timing signal applied as inputs thereto for sampling the timing portion of said detected television signal, filter means, means for applying said sampled timing portion of said television signal to said filter means, said filter means providing at an ouput thereof in response to said detected signal applied as an input thereto a first signal having a value manifesting the average peak level of said timing portion of said television signal and a second signal having a value manifesting the magnitude of the noise in said timing portion of said television signal, and comparision means responsive to said first and second signals applied as input signals thereto for providing a third signal at an output thereof having a value manifesting the ratio of the value of said first signal to said second signal.

12. The apparatus of claim 11 wherein said filter means includes a D. C. filter and a bandpass filter and; said comparison means includes a D.C. meter selectively coupled to said D.C. filter and said bandpass filter, said apparatus further includes means for selectively setting the value of said first signal to a certain value, said meter providing an indication of the ratio of the value of said second signal to said certain value.

13. The apparatus of claim 11 having a certain noise FIGURE and further including noise compensation means coupled to said detecting means to compensate for the value of said certain noise in said apparatus.

14. In combination:

An input terminal for receiving a transmitted television signal, signal detecting means for detecting said television signal, a settable attenuator connected between said input terminal and said detecting means, cycle sampling means for sampling solely the same certain portion of each cycle of a sufficient proportion of cycles of said television signal to thereby provide as an output thereof a signal having an average value manifesting the average peak level of said television signal and a standard deviation value manifesting the magnitude of the noise in said television signal, a low pass filter, a bandpass filter, a pulse stretch circuit coupled between said sampling means and said filters for stretching each of said sample portions and applying said stretched portions to said filters, means responsive to a signal passed to said bandpass filter for producing a D.C. signal having a value manifesting the magnitude of the standard deviation of said sampled portion when said bandpassed signal is applied thereto, and indicating means coupled to the last mentioned means and to said low pass filter for providing an indication of the signal to noise ratio of said television signal by comparing the value of the signal passed by said low pass filter and the value of said D.C. signal.

15. A method for measuring the signal to noise ratio of a periodic input signal, comprising:

sampling solely the same certain portion of each cycle of a sufficient proportion of cycles of said input signal to thereby provide as an output thereof a signal comprising a plurlity of input signal samples whose average value manifests the average peak level of said input signal and whose standard deviation value manifests the magnitude of the noise of the input signal, deriving from said output signal applied as an input thereto a first signal having a value manifesting said average value and a second signal having a value manifesting said standard deviation value, and comparing the value of said first signal to the value of said second signal to thereby provide an output signal manifesting the signal to noise ratio of said input signal.

* * * * *